F. B. CLEMENT.
REGULATOR FOR DROP WINDOWS FOR CLOSED AUTOMOBILES.
APPLICATION FILED AUG. 17, 1915.
1,157,677.  Patented Oct. 26, 1915.
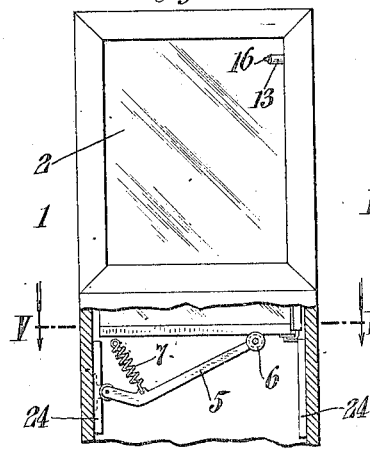
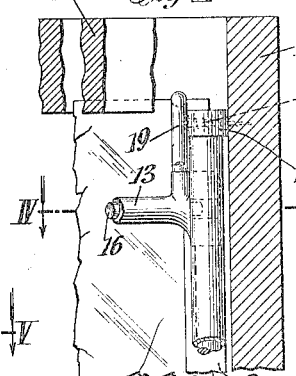
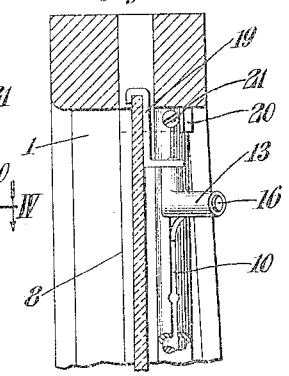
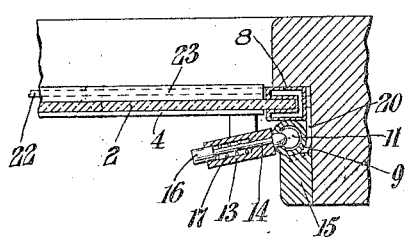
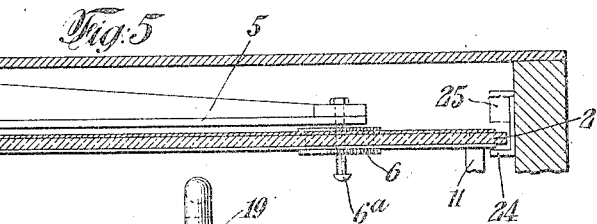
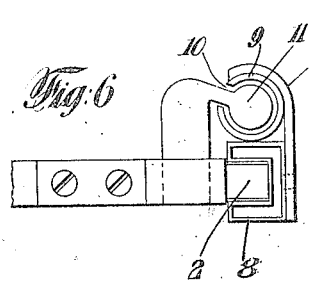
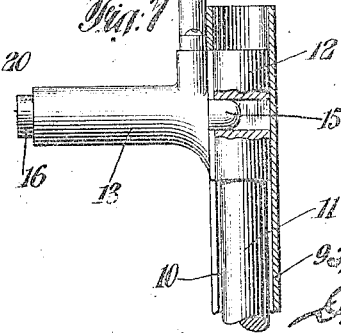
INVENTOR
Frank B. Clement,
BY
his ATTORNEYS.

UNITED STATES PATENT OFFICE.

FRANK B. CLEMENT, OF MERRIMAC, MASSACHUSETTS.

REGULATOR FOR DROP-WINDOWS FOR CLOSED AUTOMOBILES.

1,157,677.   Specification of Letters Patent.   Patented Oct. 26, 1915.

Application filed August 17, 1915.   Serial No. 45,935.

*To all whom it may concern:*

Be it known that I, FRANK B. CLEMENT, a citizen of the United States, and resident of Merrimac, county of Essex, and Commonwealth of Massachusetts, have invented certain new and useful Improvements in Regulators for Drop-Windows for Closed Automobiles, of which the following is a specification.

The main object of this invention is to provide a regulator for drop windows, of simple construction adapted particularly for use in closed automobile bodies.

The invention consists primarily in providing a simple supporting frame for the window glass and a means by which the window may be supported and locked in any one of several positions.

Another object of the invention is to provide a simple counterbalance for the window glass and a simple glass holding and locking means operating in conjunction therewith.

In the drawing, Figure 1 is an elevation of the window and its counterbalance, a portion of the frame being shown in sectional view; Fig. 2 a detailed front elevation of the window glass and its supporting and locking means; Fig. 3 a vertical sectional view; Fig. 4 a horizontal sectional view on the line IV—IV of Fig. 2; Fig. 5 a horizontal sectional view on the line V—V of Fig. 1; Fig. 6 a detailed bottom plan view of a portion of the window; and Fig. 7 a detailed view of a portion of the locking tube and guide.

Referring to the various parts by numerals, 1 designates the window frame which may be of any suitable construction, but this frame construction is preferably such as will adapt it for use in a closed automobile body.

Adapted to slide vertically in the frame is a window glass 2, said glass being provided at its lower edge with a channel 4. This channel is preferably of metal; sheet brass being suitable for that purpose. Pivotally mounted on one of the pillars of the window frame or casing is a counterbalance lever 5, said lever carrying at its outer free end a grooved roller 6 which is adapted to receive the lower edge of the window. Connected at one of its ends to said lever is a spring 7 whose other end is secured to the window casing, said spring being of sufficient tension to counterbalance the weight of the window glass and to assist materially in raising the window to its closed position. The window glass is preferably guided at its vertical edges in metal guide channels 8 secured in the window casing, as shown clearly in Figs. 3 and 4 of the drawing.

In the window casing, at the side thereof and adjacent to the guide 8, is secured a guiding and supporting tube 9. This tube is open at its lower end and is slotted vertically as shown at 10 in Fig. 3. Secured rigidly to the lower edge of the channel 4 is a guide bar 11 said bar extending upwardly into the tube and fitting snugly therein. Secured to the upper end of this bar is a locking head 12 said head extending outwardly through the slot 10 and carrying an operating arm 13. This arm is tubular and mounted therein is a locking pin 14 having a head 15 at its inner end, said head lying within the guide tube 9 and in the head 12. On the outer end of the locking pin is formed an enlargement or button 16 and between said button and the inner end of the arm 13 is a spring 17, said spring normally pressing the operating pin outwardly. The guide tube 9 at certain intervals is formed with the recesses or notches 18 adapted to receive the head 15 on the locking pin. Rigidly connected to the operating arm 13 is an upwardly extending clamping bar 19, the upper end of which engages the upper end of the window glass. The glass, and the channel along its lower edge, are rigidly clamped together by the rod 11, the locking head and the clamping bar 19; and the rod 11 is guided in its vertical movements by the tube 9.

The guide 8 and the tube 9 are rigidly connected together by means of clips 20. These clips are rigidly connected to the guide 8 and extend partially around the tube 9, as shown clearly in Fig. 6, to rigidly hold the tube to the guide 8. The tube 9 is pivoted at its upper end by means of a screw 21 which passes through the upper end of the tube and through the clip 20. By means of this pivot the tube and the guide 8 may be swung together inwardly when it is desired to drop the window below the window opening, or as it is termed in the trade, into the lower berth.

The channel 4 is formed at its upper outer edge with a lip 22 which is adapted to engage the upper edge of a strip 23 secured to the sill of the window opening. When the glass is in its upper position the guide 8 and the connected tube 9 may be swung outwardly and the lip 22 engaged over the upper edge of the strip 23 to thereby securely hold the glass in its proper position. When it is desired to lower the window the locking head 15 is released and the glass raised to release the lip 22, whereupon the glass and the connected parts may be swung inwardly to bring the glass over the lower guide 24. The sash may be then lowered as far as desired into the said guide. The guide 24 is rigidly supported so that the glass will be held therein against swinging movement. The upper end of the guide 24 is expanded as shown at 25 in order to form an enlarged mouth. This insures the glass entering the guide 24.

The guide roller 6 is loosely mounted on a long pin 6ᵃ in order that it may move inwardly and outwardly with the lower edge of the glass.

The operation of the device will be obvious from the foregoing description. The locking pin is pressed inwardly to release the head 15 from one of the notches 18 and the window is then free to be moved vertically to bring the locking pin into register with another recess 18; and then upon releasing the locking pin the head 15 will be snapped into said recess 18 and the window locked in its new position. By reason of the counterbalance lever and its spring the window glass will be accurately guided in the vertical side channels 8 and may be raised or lowered by a very slight pressure on the operating arm 13. It is obvious that the glass may be framed completely with metal channels if desired, and that such frame may be of any desired or suitable form. By providing the guide bar 11 operating in the guide tube 9 the window glass will be held in its true position at all times and there will be no tendency to bind or cramp in the guides during the operations of raising or lowering the glass. By providing the operating arm with the locking pin which may be operated as a push button to release the window, the device may be easily handled and the window readily raised or lowered.

What I claim is:

1. A regulator for a drop window comprising a glass, guiding means therefor, a guide and locking tube formed with a vertical slot, a supporting bar connected to the lower end of the glass and extending through said guide tube, a locking head connected to the upper end of said rod and extending outwardly through the vertical slot in the guide tube, a clamping rod connected to said locking head and to the upper edge of the glass, and means carried by the locking head to lock said head to the guide tube to hold the glass in its adjusted position.

2. A regulator for a drop window comprising a glass, guiding means therefor, a guide and locking tube formed with a vertical slot, a supporting bar connected to the lower end of the glass and extending through said guide tube, a locking head connected to the upper end of said rod and extending outwardly through the vertical slot in the guide tube, a clamping rod connected to said locking head and to the upper edge of the glass, and a spring-pressed locking pin carried by the locking head and adapted to lock the head to the guide tube to hold the glass in its adjusted positions.

3. A regulator for a drop window comprising a glass, vertical guiding means therefor, a guide and locking tube formed with a vertical slot, a supporting bar connected to the lower end of the glass and extending through said guide tube, a locking head connected to the upper end of said rod and extending outwardly through the vertical slot in the guide tube, a clamping rod connected to said locking head and to the upper edge of the glass, and an outwardly pressed locking pin formed with a locking head at its inner end adapted to engage recesses in the guide tube said pin being adapted to be forced inwardly to release said head from said tube.

4. A regulator for a drop window comprising a glass, vertical guiding means therefor, a guide and locking tube formed with a vertical slot, a supporting bar connected to the lower end of the glass and extending through said guide tube, a locking head connected to the upper end of said rod and extending outwardly through the vertical slot in the guide tube, a clamping rod connected to said locking head and to the upper edge of the glass, an outwardly extending tubular operating arm carried by the locking head, and an outwardly pressed locking pin mounted in said arm and formed with a head at its inner end adapted to engage one of a series of recesses in the guide tube to lock the glass in its adjusted position.

5. A regulator for a drop window comprising a glass, vertical guides therefor, a counterbalance device operating on the lower edge of said glass, a vertical guide and locking tube formed with a vertical slot, a supporting rod connected to the lower end of the glass and extending upwardly into the guide tube, a locking head connected to the upper end of said rod and extending outwardly through the slot, a clamping rod connected to the head outside of the guide tube the upper end of said clamping rod engaging the upper edge of the glass, and means for locking the supporting rod to the guide tube to hold the glass in its adjusted position.

6. A regulator for a drop window comprising a glass, vertical guides therefor, a counterbalance connected to said glass, a supporting rod connected to the lower edge of said glass and extending upwardly parallel with one vertical edge thereof, a locking head connected to said rod, a clamping bar connected to said head and engaging the upper edge of the glass, and means carried by said locking head to lock the glass in its adjusted positions.

7. A regulator for a drop window comprising a glass, a counterbalance therefor, vertical guides for said glass, a supporting rod connected to the upper and lower edges of the glass near one edge thereof, said rod being parallel and close to the said vertical edge of the glass, and means carried by said rod to lock the glass in its adjusted positions.

8. A regulator for a drop window comprising a glass, a counterbalance therefor, a guide tube formed with a vertical slot, a supporting rod connected to the lower end of the glass and extending up into the guide tube, means connecting the upper end of said rod to the upper edge of the glass, and means connected to said rod to lock it to the guide tube and to thereby lock the glass in its adjusted positions.

9. A drop window comprising a glass, vertical guiding means for the glass when it is in its upper closed position, a locking tube formed with a vertical slot and joining the upper guide for the glass, means for connecting said guide rigidly to said upper locking tube, means for pivoting the guide and locking tube at their upper ends whereby their lower ends may be swung inwardly, means carried by the glass and adapted to engage the rigid part when the glass is in its upper position, and a lower guiding means adapted to receive the glass when it is swung inwardly and lowered, a supporting bar connected to the lower end of the glass and extending through said guide tube, a locking head connected to the upper end of said rod and extending outwardly through the vertical slot in the guide tube, a clamping rod connected to said locking head and to the upper edge of the glass, and means for locking the supporting rod to the guide tube to hold the glass in any one of its adjusted positions.

In testimony whereof I hereunto affix my signature.

FRANK B. CLEMENT